June 13, 1967  C. C. OLSON  3,325,132
SPIRALING SUPPORT ARM ASSEMBLY
Filed May 10, 1965  3 Sheets-Sheet 1
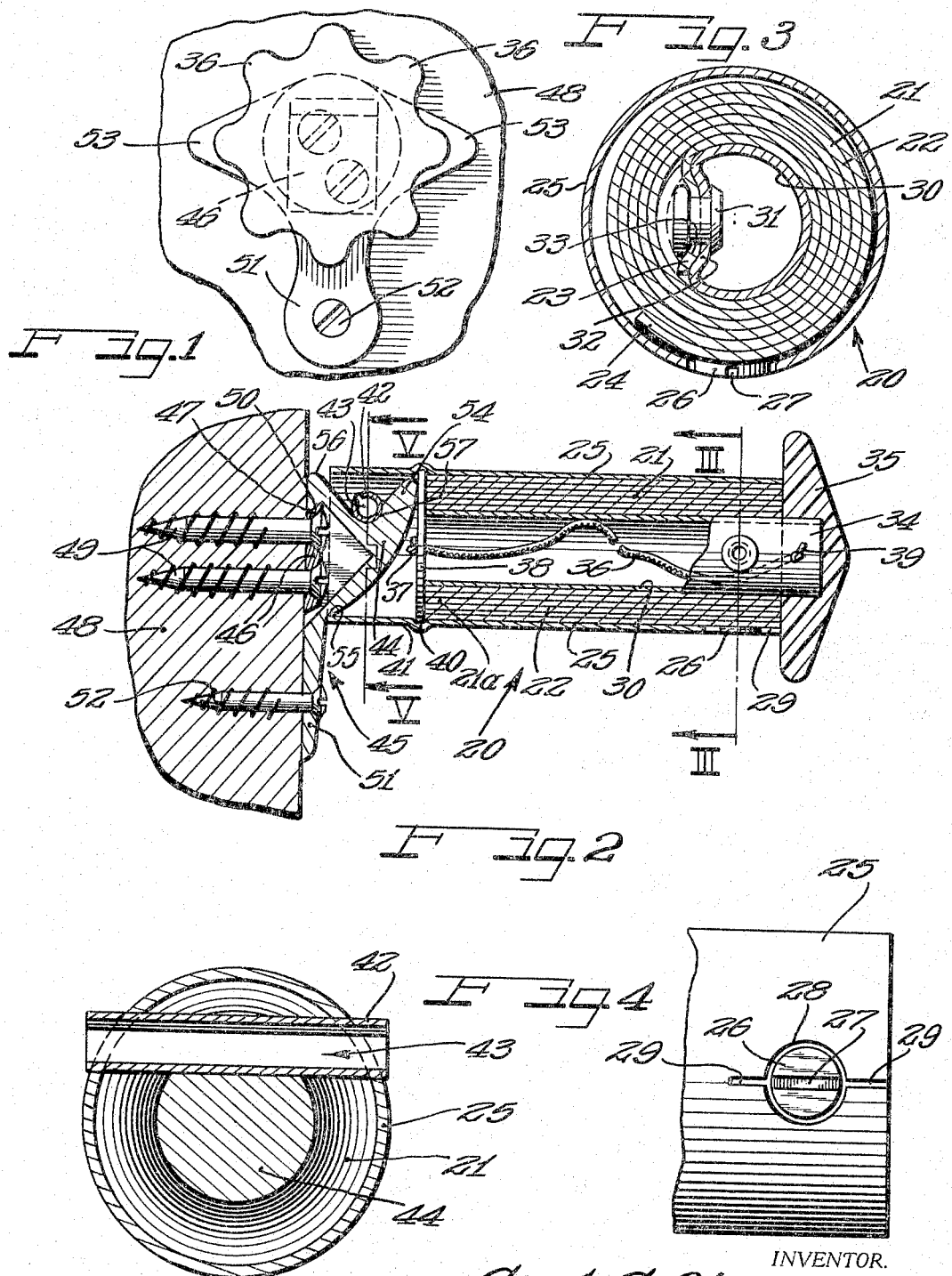
INVENTOR.
Carl C. Olson June 13, 1967  C. C. OLSON  3,325,132
SPIRALING SUPPORT ARM ASSEMBLY
Filed May 10, 1965  3 Sheets-Sheet 2
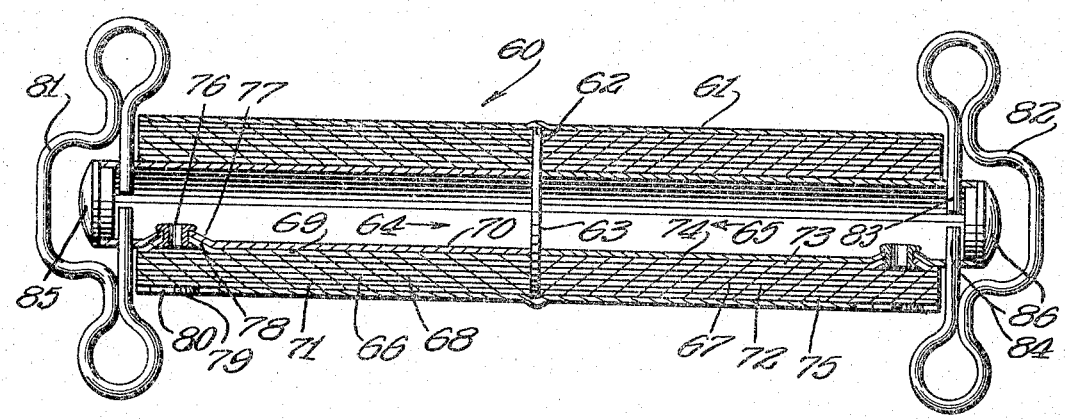
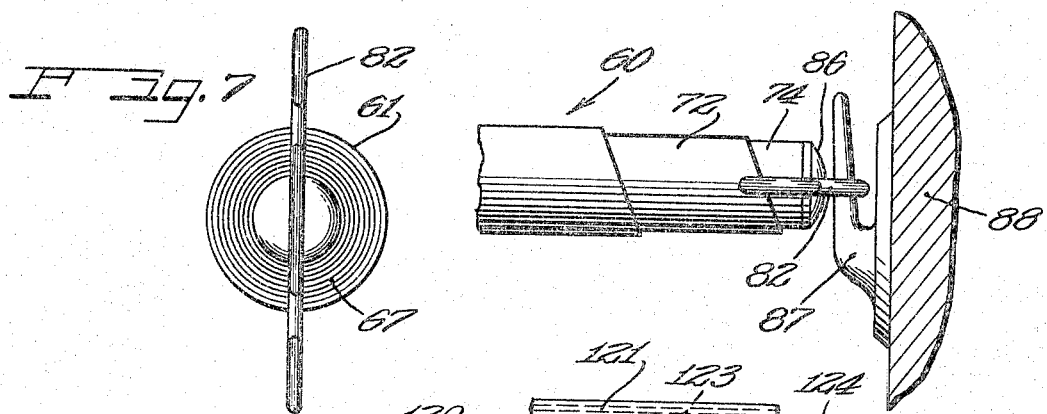
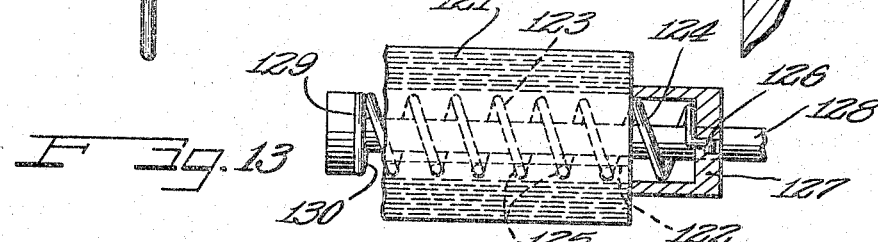
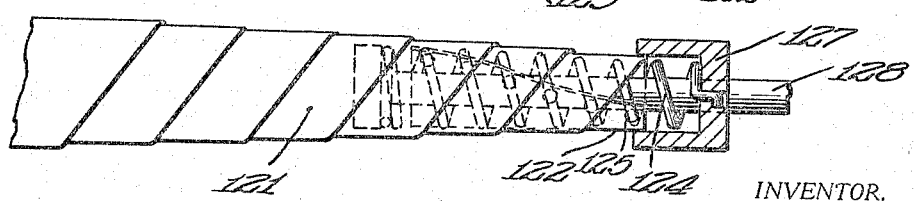
INVENTOR.
Carl C. Olson
BY Hill, Sherman, Meroni, Gross & Simpson
ATTORNEYS June 13, 1967 C. C. OLSON 3,325,132
SPIRALING SUPPORT ARM ASSEMBLY
Filed May 10, 1965 3 Sheets-Sheet 3
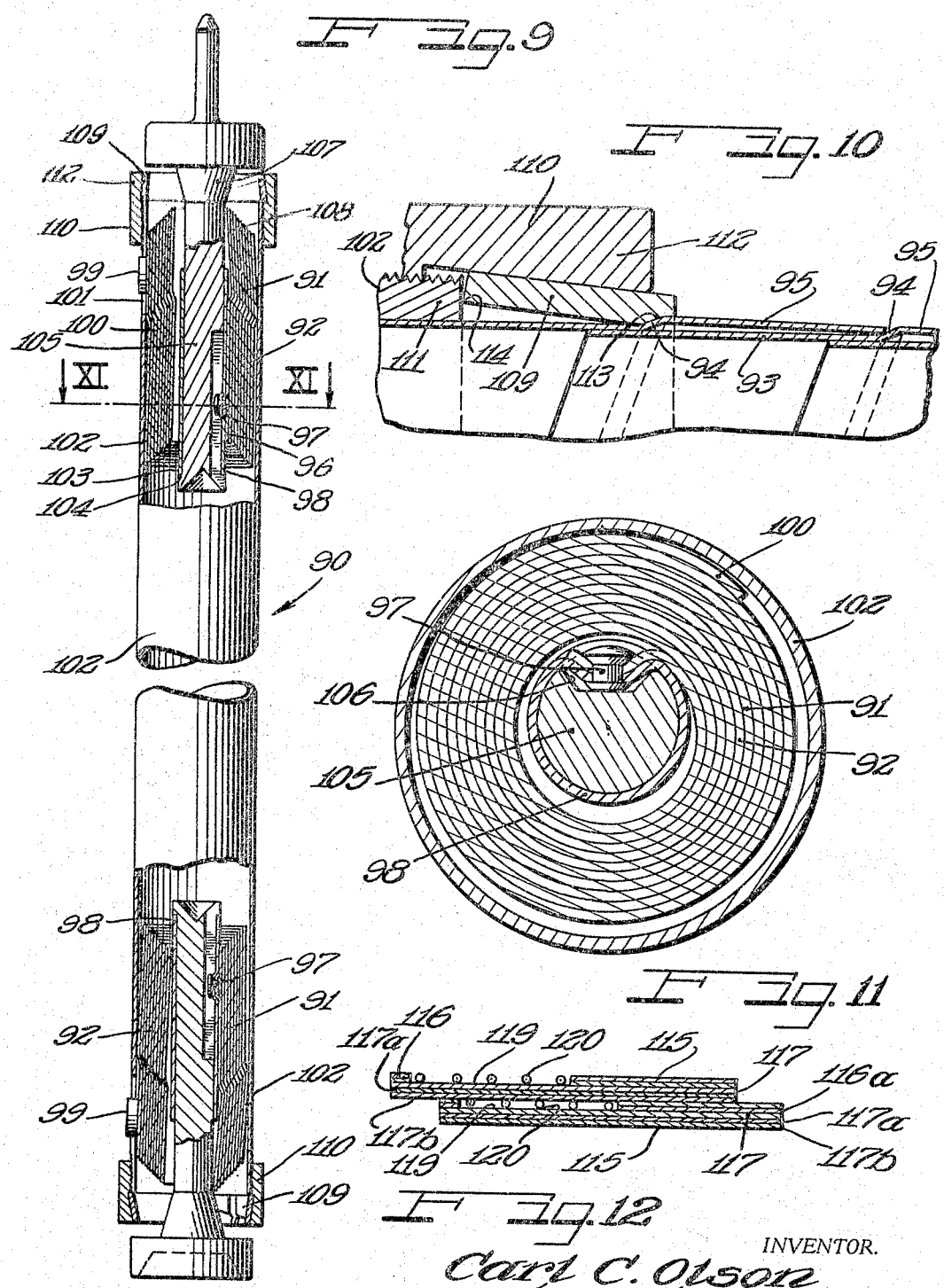
INVENTOR.
Carl C. Olson
BY Hill, Sherman, Meroni, Gross & Simpson
ATTORNEYS United States Patent Office 3,325,132
Patented June 13, 1967

3,325,132
SPIRALING SUPPORT ARM ASSEMBLY
Carl C. Olson, 3410 Milwaukee Ave.,
Northbrook, Ill. 60062
Filed May 10, 1965, Ser. No. 454,614
15 Claims. (Cl. 248—274)

This invention relates to support arms, and more particularly to an arm formed of a strip of resilient material wound in overlapping layers which is extendible to provide a rigid supporting structure.

In numerous applications there is a requirement that a supporting arm be portable, or at least be small enough so that it can be readily adapted to rather narrow or confined areas. There are other applications where a supporting arm is needed, but only for infrequent occasions, and it would thus be desirable in these instances to have an arm which could be removed during periods of non-use and yet be readily available when required.

The above examples are only a few of the unlimited occasions where an extendible support arm finds particular adaptation. However, the types of extendible support members which are useful for these occasions, such as the common telescoping arm, though capable of supporting medium to heavy loads in an extended position in most instances are not capable of collapsing into small and compact units.

It is, therefore, an object of the present invention to provide an extendible support arm.

It is another object of this invention to provide a rigid extended support arm which is collapsible into a compact unit.

Another object is to provide a rigid extendible arm formed of spiral overlapping layers.

A further object of this invention is to provide a rigid extendible arm of spiral overlapping layers wherein the layers at the ends of the arm are prevented from separating.

Other objects and advantages of this invention and a fuller understanding of the nature thereof may be had by referring to the claims and to the following detailed description taken in conjunction with the accompanying drawings.

FIGURE 1 is a plan view of a wall mounted extending support arm constructed in accordance with the principles of the present invention.

FIGURE 2 is a sectional elevational view of the extending support arm.

FIGURE 3 is a sectional view taken along the section line III—III of FIGURE 2.

FIGURE 4 is an enlarged fragmentary view illustrating one of the pivoting arrangements.

FIGURE 5 is an enlarged fragmentary view taken along the section line V—V of FIGURE 2.

FIGURE 6 is a sectional elevational view illustrating an extending support arm which extends in both directions from the center of the arm.

FIGURE 7 is an end view of the embodiment shown in FIGURE 6.

FIGURE 8 is a fragmentary view of the embodiment shown in FIGURE 6 in the extended position.

FIGURE 9 is a sectional elevational view of another embodiment of the present invention.

FIGURE 10 is an enlarged fragmentary view illustrating a lock to transfer axial thrust on the embodiment of FIGURE 9.

FIGURE 11 is an enlarged sectional view taken along the section lines XI—XI of FIGURE 9.

FIGURE 12 is a fragmentary sectional view of another embodiment of the present invention which is useful in reducing frictional forces and supporting heavier loads.

FIGURE 13 is a sectional elevational view illustrating a yielding connection at one end of the overlapping layers.

FIGURE 14 is a partial sectional view of the extending arm of FIGURE 13 in an extended position.

Referring to the drawings there is illustrated in each embodiment a basic extendible arm which is formed of a continuous strip of resilient material wound in overlapping layers and which is extendible to a rigid supporting position. The overlapping layer coil configuration is extended by moving one strip end with respect to the other strip end. At each strip end there is provided a pivoting arrangement which allows the ends to pivot, thereby preventing the layers from separating which would otherwise lessen the support capability of the arm. It is realized, of course, that the basic extendible arm herein is readily adaptable to other supporting uses, and the specific uses to be described are given by way of example only.

FIGURES 1–5 illustrate an extending wall arm 20 within which there is contained a coil 21 formed of a continuous strip 22 of resilient material which is wound in overlapping layers from an inner strip end 23 to an outer strip end 24. The strip 22 is formed of spring steel, brass, or other resilient material so that when wound in the overlapping layer configuration shown in FIGURE 3, the coil 21 is stressed outwardly providing frictional engagement between the layers.

To move the coil 21 from the collapsed position shown in FIGURE 2 to an extended position, there is provided an outer tube 25 which contains the coil 21 and is operatively associated with the strip end 24. As is best seen in FIGURE 3, the strip end 24 has a disc 26 with a split 27, the disc 26 being spot welded to the strip end 24. The disc 26 nests in a matching slot 28 with slits 29 at either end of the slot 28 provided for inserting the strip end 24 inside of the tube 25.

Because of the outward stress of the coil 21, the disc 26 is anchored in the slot 28 so that the strip end 24 can pivot as the disc 26 rotates in the slot, thus preventing separation of the final ends of the coil 21 at strip end 24. The slit 27 allows the disc 26 to be curved to follow the outline of the tube 25.

An inner tube 30 is located inside the coil 21 and is connected by a tubular rivet 31 to the inner strip end 23. The tube 30 is formed with a spherical depression 32 which matches a spherical dimple 33 on the strip end 23. The tubular rivet 31 is not staked tightly, but only enough to allow the strip end 23 to be connected to the tube 30 so that movement of the tube 30 will move the strip end 23 with respect to the strip end 24.

Because of the somewhat loosely coupled connection between strip end 23 and tube 30 by the rivet 31, the strip end 23 will pivot as the dimple 33 rotates within the depression 32 when the coil 21 is extended or collapsed, to allow the final layers forming strip end 23 to remain in frictional engagement with each other.

The width of the strip 22 and the number of turns required to form the coil 21 depends on the load requirement for the support arm, the type of material used, and the final extended arm length desired. In some instances where there is a very small load requirement, the strip ends can be rigidly attached or welded to the respective tubes 25 and 30. This rigid connection will tend to cause the strip end layers to buckle or spacially separate from one another since the ends are restrained from conforming to their natural taper as the coil is extended. However, because of the low loading requirement, the loss in frictional engagement between some of the layers and the resulting concentration of stresses will not be too significant.

Where the wall support arm 20 is to support somewhat heavier loads, a separation between the final strip end layers which concentrates stresses will have a detrimental effect on the load carrying ability of the arm 20, and in these instances there has been provided the pivoting connections at strip ends 23 and 24 to allow the ends to conform to the natural taper of the extended coil 21. Other coupling arrangements could be utilized, such as deformable end sections which would flex and take up the twisting stress at the ends of the extended coil 21 to prevent the end layers from separating.

In the preferred embodiment of FIGURES 1–5, the width of strip 22 and the number of turns in the coil 21 is such that when the coil 21 is extended there will be a minimum prescribed overlap between adjacent coil layers to form a rigid extended supporting structure.

The inner tube 30 has an end 34 rigidly attached to a handle 35, or if preferred the tube 30 and the handle 35 could be an integrally formed unit. As best seen in FIGURE 1, the handle 35 is formed with gripping edges 36.

Extension of the arm 20 is accomplished by slightly rotating the handle 35 to flex the interior end of the coil 21 so as to relieve the circumferential stress between the beginning layers at strip end 23, and pulling the tube 30 along the longitudinal axis of the arm 20 to a convenient extended position. This extends the coil 21 into a rigid spiral overlapping configuration which will maintain itself from axially collapsing by virtue of the resiliency of the material forming strip 22.

To prevent a forced and exaggerated extension of the coil 21 to a length at which the strip ends 23 and 24 would have a tendency to rupture or disengage from the tubes 25 and 30, it is sometimes desirable to include a flexible wire 36 inside the tube 30. The wire 36 has one end 37 secured to a partition 38 and another end 39 secured to the tube 30, and is cut to a prescribed length so that the coil 21 may only be extended to the corresponding length. This insures a minimum overlap in the coil layers to meet the loading requirements, and also prevents disengagement of the tubes 25 and 30 from their respective strip ends. If desired this flexible wire 36 could also be made in a spring form with recoil potential, which would aid in axially collapsing the coil 21 when the circumferential stress in the beginning coil is relieved by slightly rotating the handle 35.

The partition 38 is firmly retained in an annular groove 40 at a mounting end 41 of the tube 25. This partition 38 may be a plate or simply a bar to act as a restraining face against which the edges at an end 21a of the coil 21 may butt against. Also mounted within the mounting end 41 is a pin 42 which may be a standard type of roll pin or a solid or hollow rivet, and which protrudes from one side of the tube 25 to the other via an aperture 43. The purpose of this pin 42 is to lock the tube 25 to a hook 44 which forms a part of a wall mounting assembly 45.

It is realized, of course, that any suitable structure can be devised to mount the arm 20, and the wall mounting assembly 45 is described herein only as an example. The wall mounting assembly 45 includes a flat plate 46 with an upturned angled edge 47, the plate 46 being rigidly attached to a wall 48 by means of suitable screws 49.

The hook 44 which is made of a non-yielding metal, such as steel, brass, or aluminum is firmly attached to the plate 46 by a recessed lip 50 which matches the angled edge 47 to form a vertical support for the hook 44. In order to insure that the hook 44 will not rotate or otherwise move during operation of the arm 20, there is provided a downward projecting portion 51 which is secured to the wall 48 by a screw 52, and a pair of projecting side ears 53 which form a broader support base for the assembly 45.

A projecting portion 54 and a ledge 55 of the hook 44 match the inside diameter of the mounting end 41 of the tube 25, so that the tube 25 may be slipped over the hook 44. The projecting portion 54 and a sloping ledge 56 define a pocket 57 into which is nested the pin 42 when the arm 20 is placed over the portion 54 and firmly seated to a horizontal position.

It may be noted that when the extending arm 20 is not desired, it may be readily slipped off of the wall mounting assembly 45 so as to expose the projecting portion 54 of the hook 44. This is highly advantageous, where for example, the assembly 45 is mounted in a guest closet and the hook 44 is available for supporting umbrellas, frequently used apparel, spare hangers, etc. Then when there is a need for a rigid support arm, such as to hang clothes, etc., the arm 20 may quickly be placed on the assembly 45, and the handle 35 rotated and pulled to spirally extend the coil 21. Thus there is provided in FIGURES 1–5 a portable arm capable of forming a rigid support arm in an extended position.

FIGURES 6–8 illustrate a second embodiment in which an extending arm 60 includes an outer tube 61 with an annular groove 62 to restrain a partition 63. The partition 63 divides the tube 61 into a pair of coil housings 64 and 65, each of these housings containing an extendible coil 66 and 67. The extendible coils are formed similar to the coil 21, for example the coil 66 has a strip 68 of resilient material wound in overlapping layers from one strip end 69, coupled to an inner tube 70, to another strip end 71 coupled to the outer tube 61. The coil 67 is formed similarly in housing 65 with a resilient strip 72 wound from a strip end 73, coupled to an inner tube 74, to a strip end 75 coupled to outer tube 61.

The coupling of each strip end to the corresponding tube is accomplished as in the embodiment illustrated in FIGURES 1–5 and is the same for the coils 66 and 67, therefore only one side will be described. A tubular rivet 76 passes through and couples strip end 69 to tube 70, with a spherical depression 77 in the tube 70 and a spherical dimple 78 in the strip end 69 allowing the strip end 69 to properly pivot and assume the natural extended taper form of coil 66. Also a disc 79 and slot 80 arrangement at the outer tube 61 prevents the strip end 71 from disjoining or separating from adjacent coil layers.

A pair of handles 81 and 82 formed of a stiff wire which may be rubber covered, each has two ends 83 and 84, inserted into apertures in opposite sides of the respective inner tubes 70 and 74. Each of the tubes 70 and 74 is provided with plastic or rubber bumper caps 85 and 86 which are pressed onto the exposed tube ends so as to resist end sway when the arm 60 is mounted for use.

FIGURE 8 illustrates the arm 60 mounted to a hook 87. The hook 87 is securely attached to a wall 88 by suitable means not shown. The handle 82 slips over the hook 87 at one end of the arm 60, the other end of the arm 60 being similarly hooked. This arrangement finds particular use as an extendible support arm for supporting items between hooks normally present in automobiles. The arm 60 in its collapsed position shown in FIGURE 6 could easily fit into the glove compartment or trunk of an automobile and would be readily accessible for use as a support arm.

The extension of the arm 60 shown in FIGURE 6 may be accomplished by holding the tube 61 with one hand and rotating and pulling the handle 82 with the other hand. This same procedure is used on the handle 81, and the spiral overlapping extended arm will maintain itself in any extended position since the resilient layers are in frictional engagement because of the circumferential stress of the resilient coil. The respective handles 81 and 82 are then placed over the hooks and there is provided a rigid support arm. When used in an automobile the caps 85 and 86 will also prevent marring or disfiguring of the hooks 87.

In FIGURE 6 it may be noted that the coils 66 and 67 are both wound in the same direction around their longitundinal axis. If however, the coil 66 was wound in a direction opposite to that of coil 67, then extension of the arm 60 could be readily accomplished in one motion by rotating handles 81 and 82 in opposite directions and pulling away from each other to extend arm 60 to its desired length. In either case, collapsing of each coil is effected by again slightly rotating the handles to remove the circumferential stress from the beginning layers and returning the inner tube toward its original position within the coil.

In some applications such as tent pole or a walking stick a support arm is required to support a load along the longitudinal axis. FIGURES 9–11 illustrate another embodiment of the present invention in which there is utilized the basic extending coil configuration, as previously described, but which is capable of withstanding loads along the coil axis.

FIGURE 9 shows an extendible arm 90 which has identical extending coils 91 at each end thereof, the following description being directed to either coil unless otherwise indicated. The coil 91 has overlapping layers 92 wound of a continuous strip of resilient material, the strip being formed with a continuous flat portion 93, a ledge 94, and a sloping portion 95 as shown most clearly in FIGURE 10. In FIGURE 9 the coil 91 is in a collapsed position with an inner strip end 96 coupled by a tubular rivet 97 to a tube 98 in a manner as previously described so as to form a pivoting connection therebetween. Also, a disc 99 is rigidly attached to an outer strip end 100 and nests within a matching slot 101 in an outer tube 102. The resiliency of the wound coil 91 urges the disc 99 outwardly to rotate within the slot 101 as the coil 91 is exended and collapsed so that the coil layers are permitted to assume their natural taper form.

The tube 98 has an operating end 103 to engage a ridge 104 formed in a rod 105, so that rotating the rod 105 with respect to the outer tube 102, and pulling in an axial direction spirally extends the coil. The rivet 97 sits within a groove 106 in the rod 105, so that after extension the rod can be urged back towards the outer tube 102 until the tapered portion 107 engages the coil ends 108. Since the coil 91 is eccentrically disposed about the longitudinal axis of arm 90, the taper 107 is equally eccentrically disposed to allow full circumferential engagement of the coil ends 108 and thereby properly stress the coil 91 so as to aid in preventing axially collapse of the arm 90.

FIGURE 10 illustrates the position of the layers 92 after the coil 91 has been extended. It may be noted that there is some frictional engagement between the flat portions 93 of adjacent layers, and that the end of the sloping portion 95 of each upper layer probes or presses against the ledge 94 of the underlying layer. There is thus longitudinal contact from a ledge and sloping portion of one layer to the ledge and sloping portion of the underlying layer. To transfer a longitudinal load thrust from the coil 91 to the tube 102 there is provided a split ring 109 and a locking nut 110, the nut 110 threadably engaging an end 111 of the tube 102.

The locking nut 110 has one end 112 which slopes from a point just above the threads to a point slightly below the threads. As the locking nut 110 is threaded onto the outer tube 102, the sloping end 112 forces the inside diameter of split ring 109 to decrease. Continued threading of nut 110 on tube 102 very snugly forces a face 113 against the ledge 94, and an edge 114 against the end 111 of the tube 102. When the locking nut 110 has been tightened and the rod 105 has been moved towards the tube 102 so that the tapered position 107 engages the coil ends 108, a force applied in the direction of the longitudinal axis of the arm 90 will be transferred from the coil 91 to the tube 102 via the sloping portions 95, the ledges 94 and the split ring 109 and locking nut 110. There is thus provided a support arm which is extendible and capable of supporting a longitudinal load.

FIGURE 12 shows an alternative construction of the strip forming the overlapping layers, and is adaptable to occasions where the support arm must support very heavy loads. Only two layers have been illustrated although any number can be used depending on the load requirements and size limitations. A combined strip 115 is formed of five resilient strips 116, 116a, 117, 117a and 117b which are spot-welded together at their ends. The combining of five separate strips provides a much more resilient coil than could be obtained with a single strip having an equal thickness.

Because of the thickness of the combined strip 115, a large amount of force is required to extend and collapse a coil wound with overlapping layers of the strip 115. To diminish some of the frictional engagement between overlapped layers, the strips 116 and 116a form a slot 119 in which are placed a number of ball bearings 120. The resiliency of the wound coil urges the strip 116 against the strip 117b so that the bearings 120 will produce rolling friction therebetween as the coil is extended and collapsed.

In FIGURES 13 and 14 there is illustrated an alternative arrangement for coupling the strip end to a moving member and yet allowing the strip end to assume its natural form when the coil is extended so as to prevent the coil layers from spacially separating. A resilient coil 121 has an inner strip end 122 attached to a coil 123 of a spring 124 by means of a series of holes. The spring 124 is secured at an end 126 to a circular piece 127. A rod 128 slides through the piece 127 and ends in a wall 129 against which rests another end 130 of the spring 124.

In the extended position of FIGURE 14, which is obtained by rotating slightly rod 128 and pulling away from the coil 121, the spiral overlapping layers are permitted to assume their natural extended taper form since the spring 124 is flexible and deforms accordingly. Although it is not shown in the drawings, it is obvious that a similar flexible coupling between the outer strip end of the coil 121 and an outer moving member could be provided either by using the described spring coupling or by a flexible rubber sheet.

Although the drawings and specification present a detailed disclosure of preferred embodiments of the present invention, it is to be understood that the invention is not limited to the specific form disclosed, but covers all modifications, changes, and alternative constructions falling within the scope of the principles taught by the invention.

I claim:
1. An extendible support arm comprising:
   a coil including a strip of resilient material wound in frictionally engaging overlapping layers, and having a collapsed position and an extended position;
   means for preventing separation of adjacent overlapped layers in said extended position; and
   means for maintaining a predetermined minimum overlap between said layers to form a rigid support arm with spiral overlapping layers.
2. An extendible support arm comprising:
   a coil including a continuous strip of resilient material wound in frictionally engaging overlapping layers;
   means for moving said coil from a collapsed position to an extended position; and
   pivot means at said strip ends to prevent said overlapping layers from spacially separating as said coil is moved to said extended position by allowing said strip ends to pivot to their desired form.
3. An extendible support arm comprising:
   a coil including a continuous strip of resilient material wound in frictionally engaging overlapping layers;
   means for moving said coil from a collapsed position to an extended position; and
   deformable means at said strip ends to deform as said coil is moved to said extended position so as to allow said overlapping layers to maintain frictional engagement.
4. An extendible support arm comprising:
   an extendible coil including a continuous strip of resilient material wound in frictionally engaging overlapping layers to form a rigid support arm which resists applied loading transverse to said extended coil;
a first member pivotally engaging one end of said strip; and
a second member pivotally connected to the other end of said strip, said first and second members allowing the ends of said strip to be extended and preventing the separation of said overlapping layers.

5. An extendible support arm comprising:
an extendible coil including a continuous strip of resilient material wound in frictionally engaging overlapping layers to form a rigid support arm which resists applied loading transverse to said extended coil;
a first tubular member containing said coil;
a disc rigidly attached to one end of said strip and engaging said first tubular member to form a pivoting connection between said strip and said member;
a second member engaging the other end of said strip to extend said coil; and
connecting means for pivotally connecting said second tubular member to said other strip end, so that movement of said members with respect to each other provides continuously frictionally engaging overlapping coil layers as said coil is extended and contracted.

6. An extendible support arm comprising:
a first tubular member;
an extendible coil at each end of said tubular member, each coil including a continuous strip of resilient material wound in frictionally engaging overlapping layers to form a rigid support arm which resists applied loading transverse to said extended coils;
means for pivotally engaging one strip end of each coil to said first tubular member; and
means pivotally connected to the other strip end of each coil to move said respective strip ends and thereby extend and contract said coils to rigid supporting positions.

7. An extendible support arm comprising:
a coil including a plurality of continuous strips of resilient material, said strips securely interconnected and wound in frictionally engaging overlapping layers with one another along the entire length of each; and
means for moving one combined strip end with respect to the other to extend said coil to provide a rigid support arm for severe transverse arm loadings.

8. An extendible support arm comprising:
a coil including a plurality of continuous strips of resilient material, said strips securely interconnected and wound in frictionally engaging overlapping layers;
bearing means mounted throughout the length of said coil and between adjacent overlapped layers to provide a readily extendible and collapsible coil; and
means for moving one combined strip end with respect to the other to extend said coil and thereby provide a rigid support arm for severe transverse arm loadings.

9. An extendible support arm comprising:
an extendible coil including a continuous strip of resilient material wound in overlapping layers around a longitudinal axis, said strip formed with a continuous locking portion; and
means for extending the ends of said strip with respect to each other and to lock said overlapping layers at said locking portion around the circumference of said extended coil so as to resist longitudinal collapse of said coil.

10. An extendible support arm comprising:
an extendible coil including a continuous strip of resilient material wound in overlapping layers around a longitudinal axis, said strip formed with a continuous locking portion;
a rigid tubular member for containing said coil, one end of said strip pivotally engaging said member;
means pivotally connected to the other end of said strip to extend said coil until said overlapping layers lock at said locking portion around the circumference of said extended coil; and
means rigidly connected to said tubular member and circumferentially engaging said locking portion to transfer loads along said coil to said rigid tubular member so as to resist longitudinal collapse of said coil.

11. An extendible support arm comprising:
an extendible coil including a continuous strip of resilient material wound in overlapping layers around a longitudinal axis, said strip formed with a continuous locking portion;
a first rigid tubular member for containing said coil, one end of said strip pivotally engaging said member;
a second rigid member positioned within said coil and pivotally connected to the other end of said strip to extend said coil until said overlapping layers lock at said locking portion around the circumference of said extended coil, said second rigid member having a tapered section outwardly flexing one end of said extended coil; and
locking means rigidly connected to said first member and circumferentially engaging said locking portion to transfer loads along said coil to said rigid tubular member so as to resist longitudinal collapse of said coil.

12. An extendible support arm comprising:
an extendible coil including a continuous strip of resilient material wound in overlapping layers around a longitudinal axis, said strip formed with a continuous locking portion;
a first rigid tubular member for containing said coil, one end of said strip pivotally engaging said member;
a second rigid member positioned within said coil and pivotally connected to the other end of said strip to extend said coil until said overlapping layers lock at said locking portion around the circumference of said extended coil, said second rigid member having a tapered section outwardly flexing one end of said extended coil;
a lock nut threadably engaging one end of said first rigid tubular member; and
a split ring within said nut, including one end in abutting relation with said first member, and another end circumferentially engaging said locking portion; so that threadably tightening said lock nut depresses said split ring into firm end contact with said first member and said coil to transfer loads along said coil to said rigid tubular member and thereby prevent longitudinal collapse of said coil.

13. An extendible support arm comprising:
a coil including a continuous strip of resilient material wound in frictionally engaging overlapping layers and defining an inner portion;
a first member formed around said coil to engage one end of said strip;
a second member inserted into said coil inner portion to engage the other end of said strip; and
restraining wire means interconnecting said first member and said second member to restrain the movement of said members within a prescribed distance so as to maintain a minimum overlap between said layers.

14. An extendible support arm comprising:
an extendible coil including a continuous strip of resilient material wound in frictionally engaging overlapping layers to form a rigid support arm which resists applied loading transverse to said extended coil;
a first member formed around said coil to engage one end of said strip, said member having a mounting portion at one end thereof;

mounting means locked to said first member at said mounting portion to rigidly maintain said first member in position; and a second member pivotally coupled to the other end of said strip to move said strip ends with respect to each other and permit said overlapping coil layers to assume their natural coil form.

15. An extendible support arm comprising:

an extendible coil including a continuous strip of resilient material wound in frictionally engaging overlapping layers to form a rigid support arm which resists applied loading transverse to said extended coil;

a first member formed around said coil to engage one end of said strip, said member having a mounting portion at one end thereof;

mounting means for engaging said first member at said mounting portion to detachably secure said first member in position; and a second member pivotally coupled to the other end of said strip to move said strip ends with respect to each other and permit said overlapping coil layers to assume their natural coil form.

References Cited

UNITED STATES PATENTS

| | | | |
|---|---|---|---|
| 2,587,111 | 2/1952 | Cashen | 211—123 |
| 2,796,953 | 6/1957 | Becker | 267—1 |

CHANCELLOR E. HARRIS, *Primary Examiner.*

J. PETO, *Assistant Examiner.*